US012791490B2

(12) United States Patent
Chen et al.

(10) Patent No.: US 12,791,490 B2
(45) Date of Patent: Nov. 10, 2026

(54) OPTICAL DETECTION DEVICE

(71) Applicant: Wistron Corporation, New Taipei City (TW)

(72) Inventors: Yi-Hui Chen, New Taipei City (TW); Chen-Fa Wang, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 433 days.

(21) Appl. No.: 17/951,195

(22) Filed: Sep. 23, 2022

(65) Prior Publication Data

US 2023/0358686 A1 Nov. 9, 2023

(30) Foreign Application Priority Data

May 5, 2022 (TW) .................................. 111117048

(51) Int. Cl.
*G01N 21/88* (2006.01)
*G06V 10/40* (2022.01)

(52) U.S. Cl.
CPC ......... *G01N 21/8806* (2013.01); *G06V 10/40* (2022.01); *G01N 2201/0227* (2013.01)

(58) Field of Classification Search
None
See application file for complete search history.

(56) References Cited

U.S. PATENT DOCUMENTS

2008/0121778 A1* 5/2008 Imajou ................... B60N 2/305 248/590
2012/0071342 A1 3/2012 Lochhead et al.
2017/0345148 A1* 11/2017 Tomoda ................ G06T 7/0012
2018/0074084 A1 3/2018 Neveu
2019/0162740 A1* 5/2019 Nose .................. G01N 35/1002
2021/0134464 A1* 5/2021 Kasai ...................... G06F 18/24
2022/0088238 A1* 3/2022 Wade ........................ A61L 2/10

FOREIGN PATENT DOCUMENTS

CN 109856048 A 6/2019
CN 211576963 U 9/2020
CN 112540079 A 3/2021
GB 2592590 A * 9/2021 ............. B01D 15/10
JP 2000109117 A * 4/2000
JP 2006526780 A 11/2006
(Continued)

OTHER PUBLICATIONS

EESR dated Mar. 15, 2023, listed in related European patent application No. 22 204 375.4.
(Continued)

*Primary Examiner* — Kara E. Geisel
*Assistant Examiner* — Chad Andrew Reverman
(74) *Attorney, Agent, or Firm* — McClure, Qualey & Rodack, LLP

(57) ABSTRACT

An optical detection device includes a base, a cartridge placing portion, a shield cover, a processor, and an optical sensor. The base includes an opening. The cartridge placing portion is located in the base, and is in communication with the opening. The shield cover is configured to open or close the opening. When the optical sensor is actuated, the shield cover closes the opening to prevent external ambient light from entering the opening to affect the optical sensor during sensing.

5 Claims, 27 Drawing Sheets

(56) References Cited

FOREIGN PATENT DOCUMENTS

| | | | |
|---|---|---|---|
| JP | 2017045175 | A | 3/2017 |
| WO | 2020/019014 | A1 | 1/2020 |
| WO | 2022202262 | A1 | 9/2022 |

OTHER PUBLICATIONS

Examination report dated Jun. 6, 2023, listed in related Japan patent application No. 2022-131740.
Examination report dated Feb. 7, 2023, listed in related Taiwan patent application No. 111117048.
Examination report dated Mar. 13, 2026 listed in related China patent application No. 202210588979.3.

* cited by examiner

100e

OPTICAL DETECTION DEVICE

CROSS-REFERENCE TO RELATED APPLICATION

This non-provisional application claims priority under 35 U.S.C. § 119(a) to Patent Application No. 111117048 filed in Taiwan, R.O.C. on May 5, 2022, the entire contents of which are hereby incorporated by reference.

BACKGROUND

Technical Field

The present invention relates to a detection device, and particularly, to a detection device using optical sensing.

Related Art

According to the existing reagent detection method, after a subject's specimen is dropped into a test cartridge, the test cartridge is placed into a detection device, and the detection device interprets a detection result. According to the current detection device, an environment in which the test cartridge is placed into the detection device is an open space, the specimen in the test cartridge may volatilize, which is not conducive to the interpretation of the detection device. Consequently, misinterpretation of the detection device may be caused, and a risk that an operator is exposed to a virus-containing environment is increased.

In addition, the existing detection device uses an optical sensing method to interpret the detection result of the cartridge. As mentioned above, a region where the detection device reads the test cartridge is an open space, which may be affected by an ambient light source. Consequently, the detection device is interfered during optical sensing, to generate an abnormal image, and a possibility that the detection device misinterprets the detection result is increased.

SUMMARY

The present disclosure provides an optical detection device. According to an embodiment, the optical detection device includes a base, a cartridge placing portion, a shield cover, an optical sensor, and a processor. The base includes an opening. The cartridge placing portion is located in the base, and is in communication with the opening. The shield cover is configured to open or close the opening. The optical sensor is connected to the processor, and the optical sensor includes a light receiving element. The light receiving element is configured to convert a received light into an image signal.

According to some embodiments, the processor outputs detection information according to the image signal.

According to some embodiments, the optical detection device further includes an actuator connected to the shield cover, where the processor is configured to control the actuator to be actuated, to drive the shield cover to open or close the opening.

According to some embodiments, the optical detection device further includes a positioning detector, where the positioning detector sends a positioning signal when being actuated, the processor transmits a closing signal to the actuator in response to the positioning signal, and the actuator drives the shield cover to close the opening according to the closing signal.

According to some embodiments, the optical detection device further includes a proximity sensor, where the proximity sensor sends a sensing signal when being actuated, and the processor transmits an opening signal to the actuator in response to the sensing signal.

According to some embodiments, the optical detection device further includes a bearing platform, where the cartridge placing portion is located on the bearing platform, and the bearing platform includes a first docking structure; and the shield cover includes a body and a second docking structure, where the second docking structure is connected to the body, and is configured to be docked with the first docking structure.

According to some embodiments, the optical detection device further includes a docking sensor, where the docking sensor is located on the first docking structure or the second docking structure, and the docking sensor sends a docking signal to the processor when the first docking structure is docked with the second docking structure.

According to some embodiments, the optical sensor further includes a light emitting element, and the processor further actuates the light emitting element to emit light toward the cartridge placing portion in response to the docking signal.

According to some embodiments, the optical detection device further includes a light quantity sensor, configured to sense a light quantity in the cartridge placing portion, and to output a light quantity signal to the processor, and the processor determines, according to the light quantity signal, whether to actuate the light emitting element to emit light toward the cartridge placing portion.

According to some embodiments, the light receiving element further senses a light quantity in the cartridge placing portion before the light emitting element is actuated, and outputs a light quantity signal to the processor, and the processor determines, according to the light quantity signal, whether to actuate the light emitting element to emit light toward the cartridge placing portion.

According to the optical detection device of an embodiment of the present disclosure, the shield cover closes the opening to effectively prevent external ambient light from entering the cartridge placing portion and to reduce a risk of virus spreading, so as to protect medical staff and avoid errors in optical sensing interpretation. According to some embodiments, a docking sensor is arranged in the optical detection device, and if the shield cover does not completely close the opening when the medical staff operate the optical detection device, the light emitting element is not actuated, so as to avoid performing optical sensing under a risk that an external light source enters the opening, which increases a risk that the image signal is misinterpreted.

DETAILED DESCRIPTION

Figure 1:
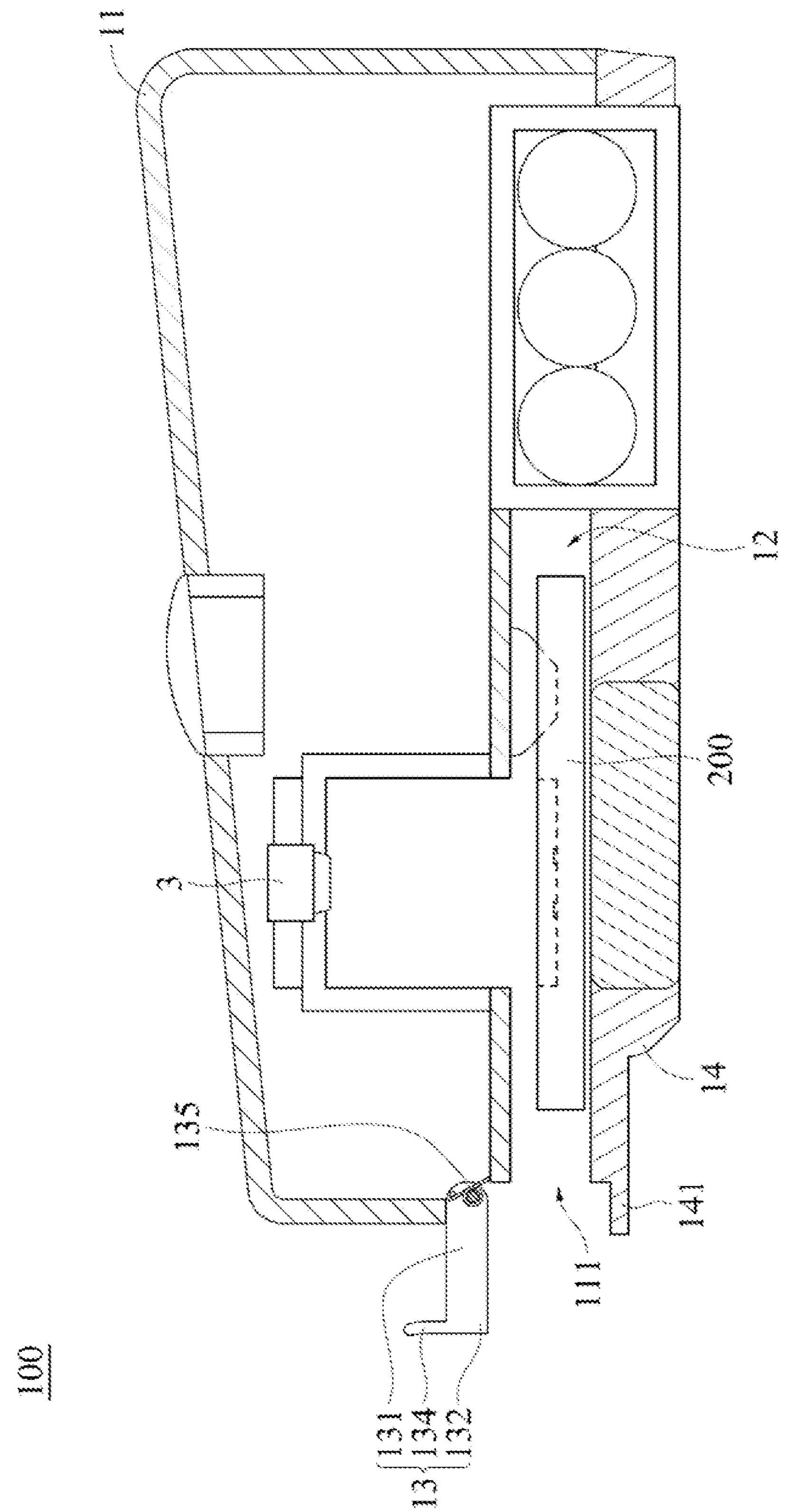
FIG. 1 is a schematic diagram of usage of an optical detection device according to an embodiment of the present disclosure.
Figure 2:
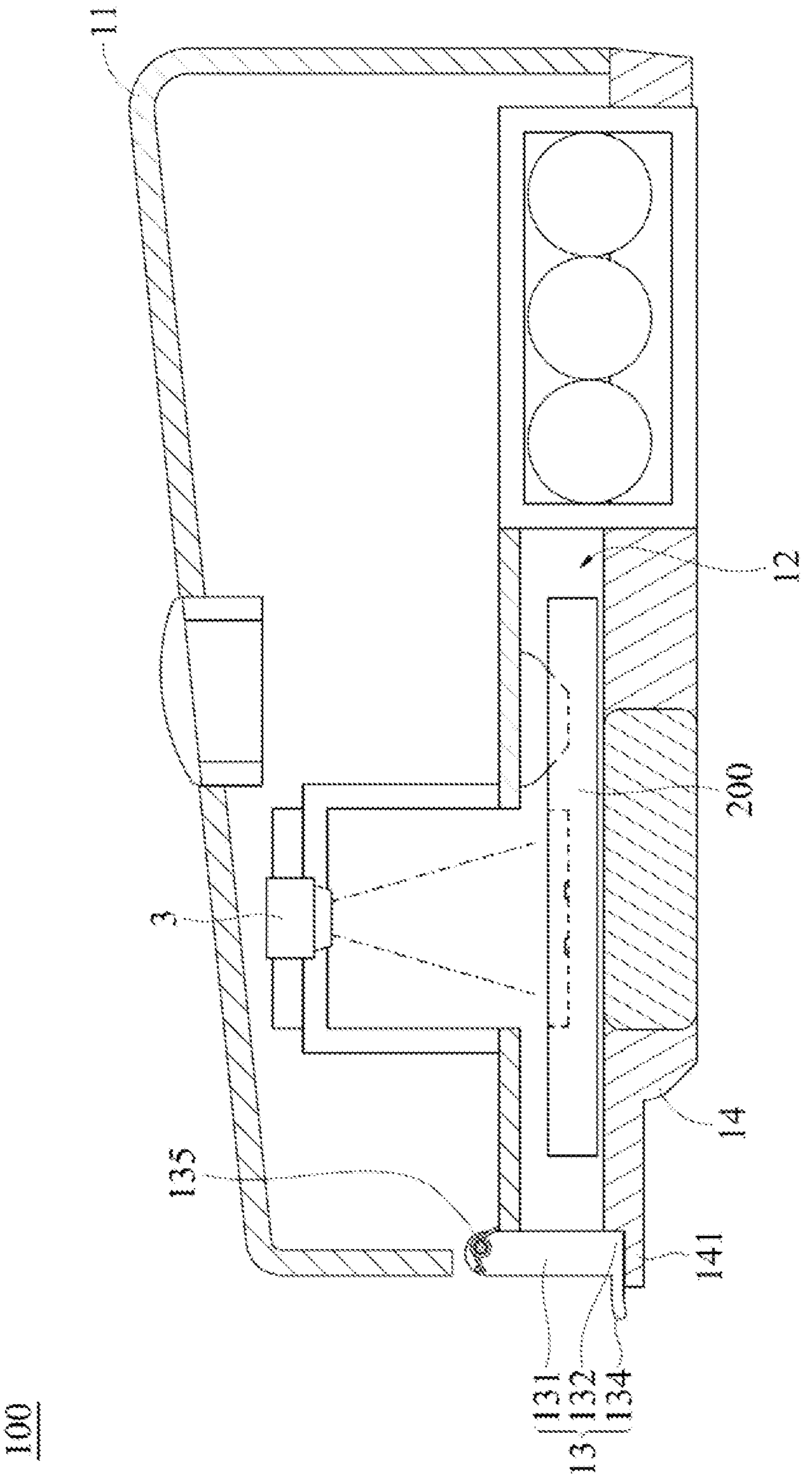
FIG. 2 is a schematic diagram of usage of an optical detection device according to an embodiment of the present disclosure.
Figure 3:
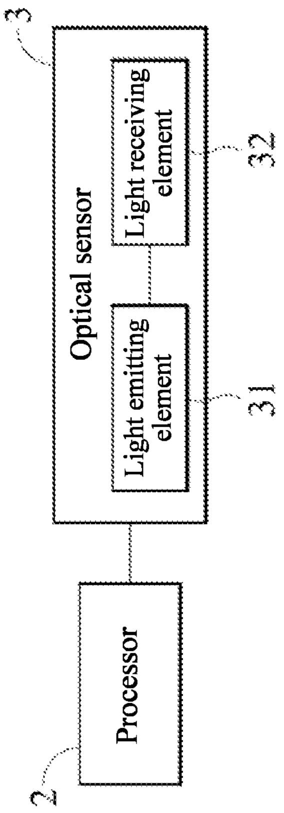
FIG. 3 is a schematic structural diagram of a processor and an optical sensor according to an embodiment of the present disclosure.

Referring to FIG. 1 to FIG. 3, FIG. 1 and FIG. 2 respectively are schematic diagrams of usage of an optical detection device 100 according to an embodiment of the present disclosure. FIG. 3 is a schematic structural diagram of a processor 2 and an optical sensor 3 according to an embodiment of the present disclosure. The optical detection device 100 includes a base 11, a cartridge placing portion 12, a shield cover 13, and an optical sensor 3. The base 11 includes an opening 111. The cartridge placing portion 12 is located in the base 11, and is in communication with the opening 111. The shield cover 13 is configured to open or close the opening 111. According to some embodiments, the shield cover 13 may be configured to open and close the opening 111 manually, as the embodiments shown in FIG. 1 and FIG. 2. According to some embodiments, the shield cover 13 is of an automated design, and may automatically open and close the opening 111 (see below for details). According to some embodiments, an end of the shield cover 13 is pivotally connected to the base 11. According to the embodiments shown in FIG. 1 and FIG. 2, the shield cover 13 is pivotally connected to the base 11 by a torsion spring 135.

According to the embodiments shown in FIG. 1 and FIG. 2, the optical detection device 100 further includes a bearing platform 14, where the cartridge placing portion 12 is located on the bearing platform 14, and the bearing platform 14 includes a first docking structure 141. The shield cover 13 includes a body 131 and a second docking structure 132. The second docking structure 132 is connected to the body 131, and is configured to be docked with the first docking structure 141. After the first docking structure 141 and the second docking structure 132 are docked with each other, the shield cover 13 closes the opening 111. As shown in FIG. 1, the first docking structure 141 is a groove, and the second docking structure 132 is a structure corresponding to the groove. The docking is in a state of matching or tight fitting, which is not limited in the present disclosure. According to the embodiments shown in FIG. 1 and FIG. 2, the second docking structure 132 includes a toggle portion 134, and the toggle portion 134 protrudes from the body 131, for the operator to toggle and grip to use, to control the shield cover 13 to open or close opening 111.

The optical sensor 3 includes a light receiving element 32. The light receiving element 32 is configured to convert a received light into an image signal. According to the embodiment shown in FIG. 3, the optical sensor 3 further includes a light emitting element 31. When the light emitting element 31 is actuated, the light emitting element 31 emits light toward the cartridge placing portion 12. The light receiving element 32 may convert a received light into an image signal. According to some embodiments, the light receiving element 32 continuously receives light in the cartridge placing portion 12 after being powered on. According to some other embodiments, the light receiving element 32 starts to receive the light in the cartridge placing portion 12 when being driven. As shown in FIG. 1 and FIG. 2, the operator places a test cartridge 200 into the cartridge placing portion 12. The light emitting element 31 emits light toward the cartridge placing portion (that is, emits light toward the test cartridge 200) when being actuated. The light received by the light receiving element 32 is light fed back from the test cartridge 200. According to the embodiment shown in FIG. 3, the optical detection device 100 further includes a processor 2, the processor 2 is connected to the optical sensor 3, and the processor 2 is configured to actuate the light emitting element 31 in response to a driving signal, causing the light emitting element 31 to emit light toward the cartridge placing portion 12. The driving signal may be automatically outputted by the processor 2 (see below for details) or be manually outputted to the processor 2. According to some embodiments, after the light receiving element 32 converts the received light into an image signal, the processor 2 outputs detection information according to the image signal.

According to some embodiments, the optical detection device 100 is a biological specimen detection device. A specimen taken out from a subject is dropped into the test cartridge 200. Then the test cartridge 200 is placed into the cartridge placing portion 12 for optical sensing, to obtain detection information. The detection information includes "Positive", "Negative" or "Invalid".

According to some embodiments, in order to prevent external ambient light from being incident on the opening 111, a light quantity in the cartridge placing portion 12 is not suitable for the light emitting element 31 to emit light, for a subsequent optical sensing step. The light receiving element 32 further senses a light quantity in the cartridge placing portion 12 before the light emitting element 31 is actuated, and outputs a light quantity signal to the processor 2, and the processor 2 determines, according to the light quantity signal, whether to actuate the light emitting element 31 to emit light toward the cartridge placing portion 12. In other words, whether a light quantity value of the light quantity signal exceeds a preset light quantity value is compared by the processor 2. When the light quantity value of the light quantity signal is lower than the preset light quantity value, it means that the cartridge placing portion 12 is suitable for optical sensing, the processor 2 actuates the light emitting element 31 to emit light, and not vice versa.

Figure 4:
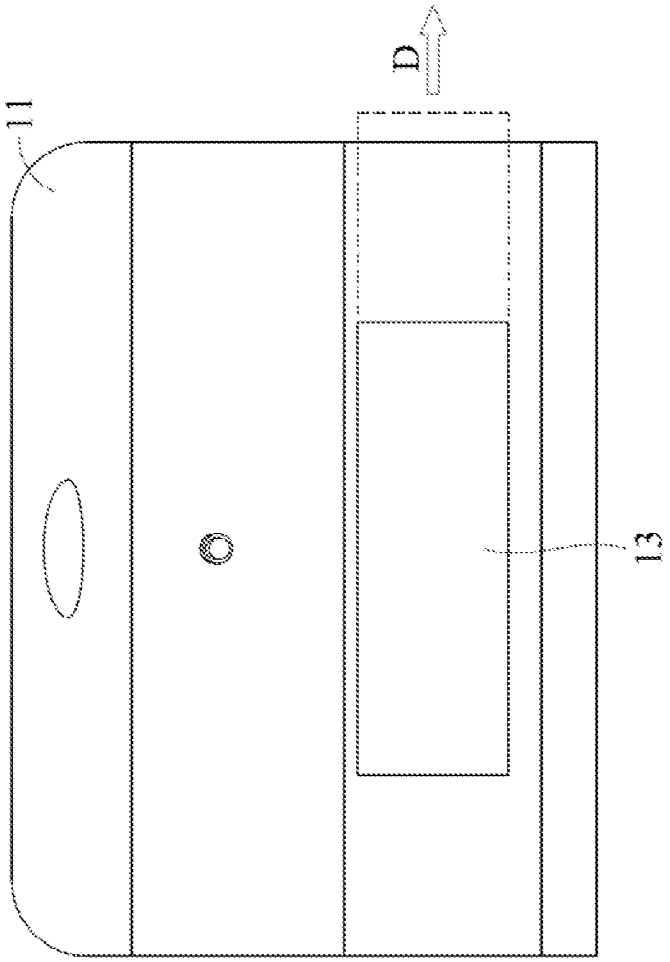
FIG. 4 is a schematic diagram of a relationship between a shield cover and an opening according to an embodiment of the present disclosure.
Figure 5:
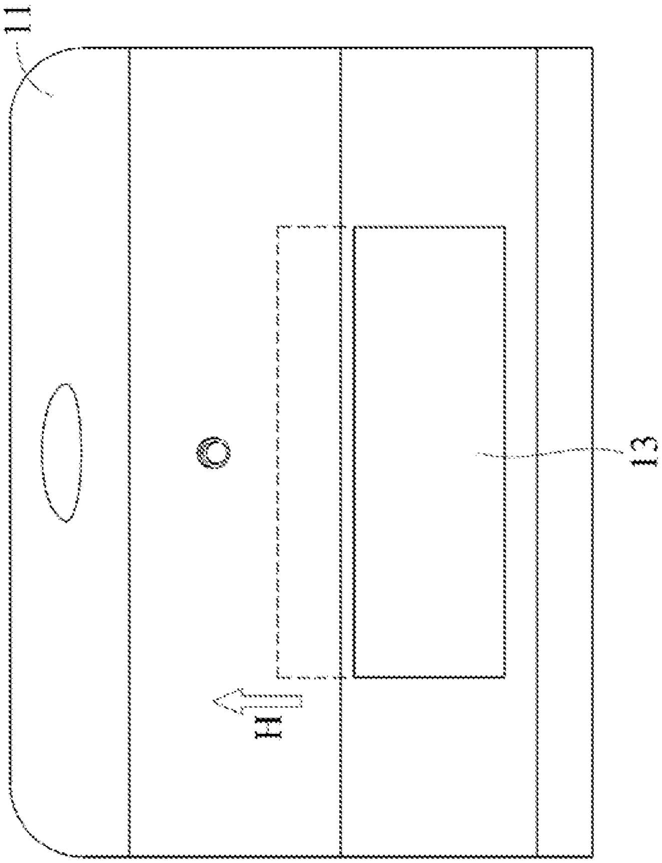
FIG. 5 is a schematic diagram of a relationship between a shield cover and an opening according to an embodiment of the present disclosure.

FIG. 4 and FIG. 5 respectively are schematic diagrams of a relationship between a shield cover 13 and an opening 111 according to an embodiment of the present disclosure. Different from the embodiments shown in FIG. 1 and FIG. 2, the shield cover 13 shown in FIG. 4 and FIG. 5 is opened or closed in a translational manner. The shield cover 13 shown in FIG. 4 moves in a horizontal direction D to open or close the opening 111, and the shield cover 13 shown in FIG. 5 moves in a vertical direction H to open or close the opening 111.

Figure 6:
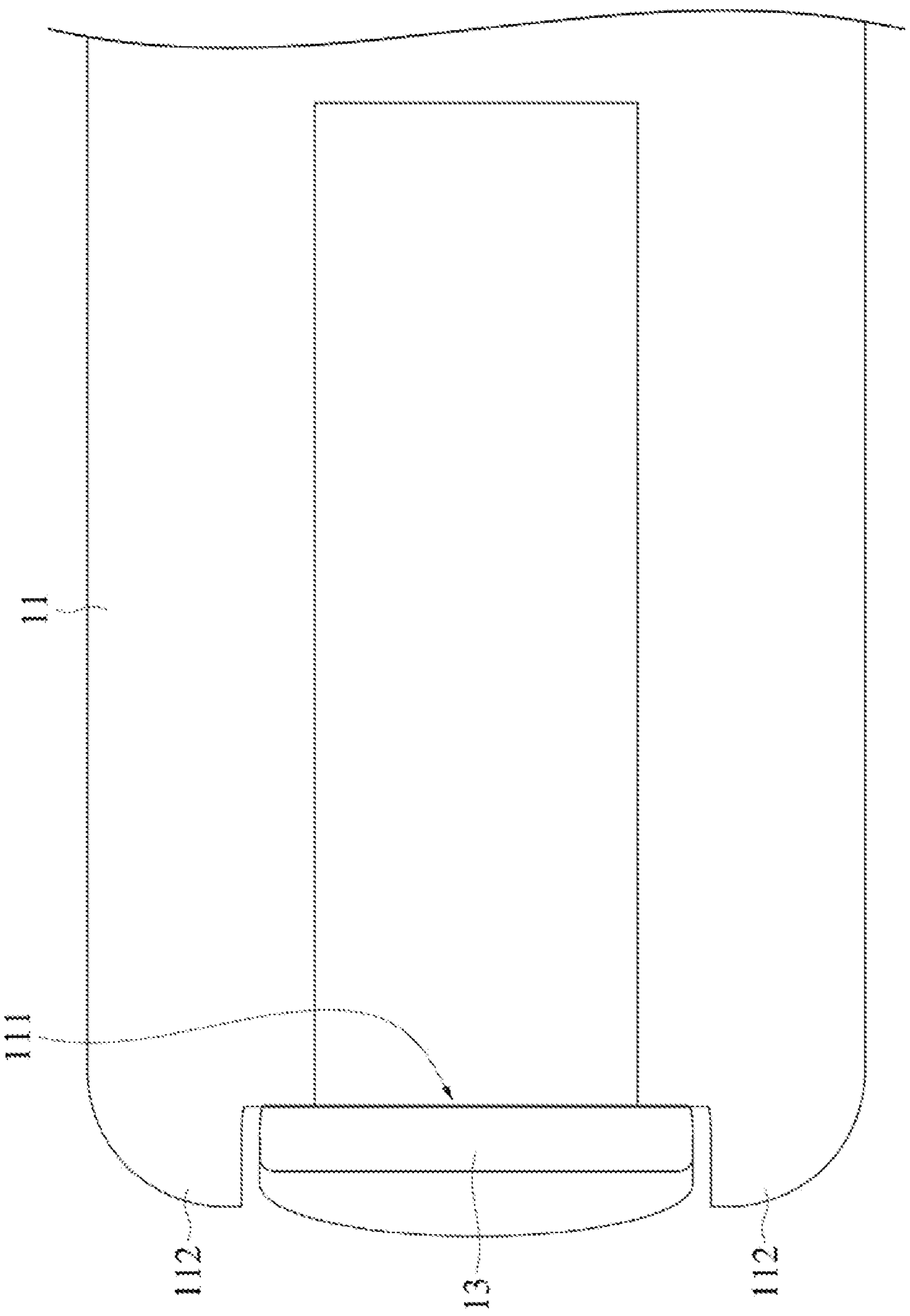
FIG. 6 is a schematic diagram of a relationship between a shield cover and a base according to an embodiment of the present disclosure.

FIG. 6 is a schematic diagram of a relationship between a shield cover 13 and a base 11 according to an embodiment of the present disclosure. According to the embodiment shown in FIG. 6, a size of the shield cover 13 is larger than that of the opening 111. In addition, the base 11 includes two protruding ribs 112, which are respectively located on two sides of the shield cover 13. With this structure, when the shield cover 13 closes the opening 111, external ambient light can be effectively prevented from entering the opening 111, thereby improving the sensing efficiency and detection accuracy of the optical sensor 3.

Figure 7:
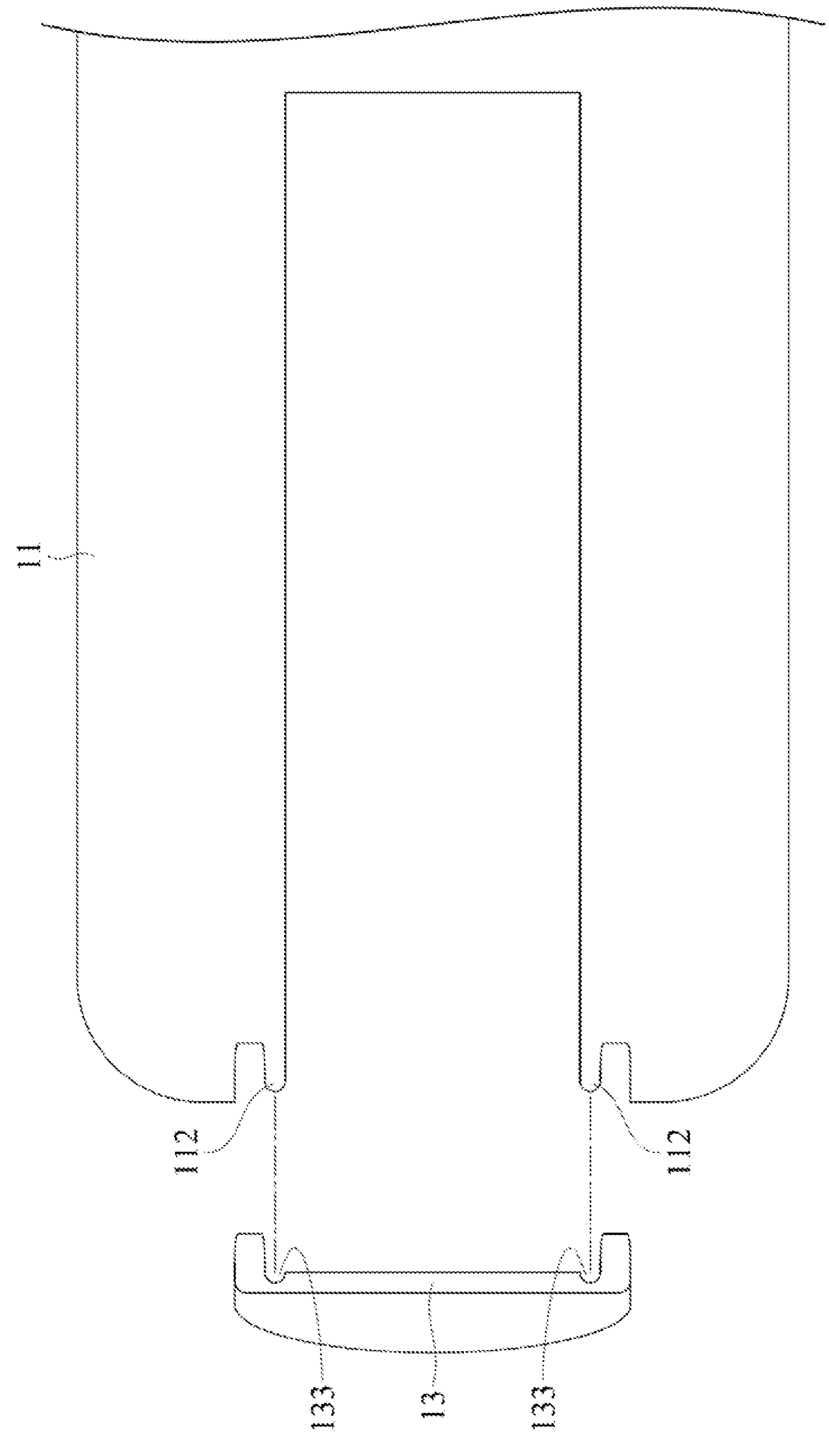
FIG. 7 is a schematic diagram of a relationship between a shield cover and a base according to an embodiment of the present disclosure.

FIG. 7 is a schematic diagram of a relationship between a shield cover 13 and a base 11 according to an embodiment of the present disclosure. According to the embodiment shown in FIG. 7, the size of the shield cover 13 is larger than that of the opening 111, the base 11 includes two protruding ribs 112, the shield cover 13 includes two sliding grooves 133, and the two protruding ribs 112 are respectively detachably located in the two sliding grooves 133. With this structure, when the shield cover 13 closes the opening 111, external ambient light can also be effectively prevented from entering the opening 111, thereby improving the sensing efficiency and detection accuracy of the optical sensor 3.

Figure 8:
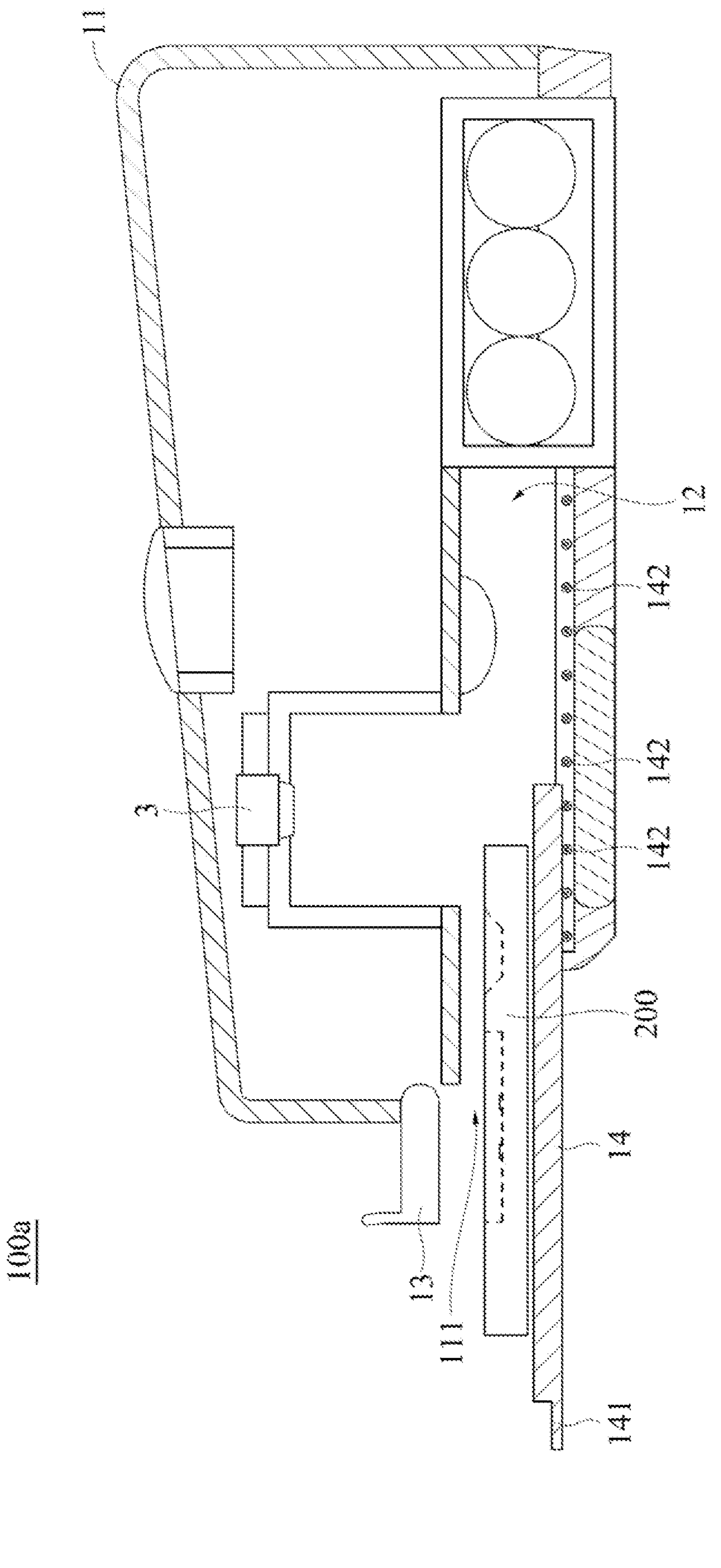
FIG. 8 is a schematic structural diagram of a bearing platform of an optical detection device according to an embodiment of the present disclosure.
Figure 9:
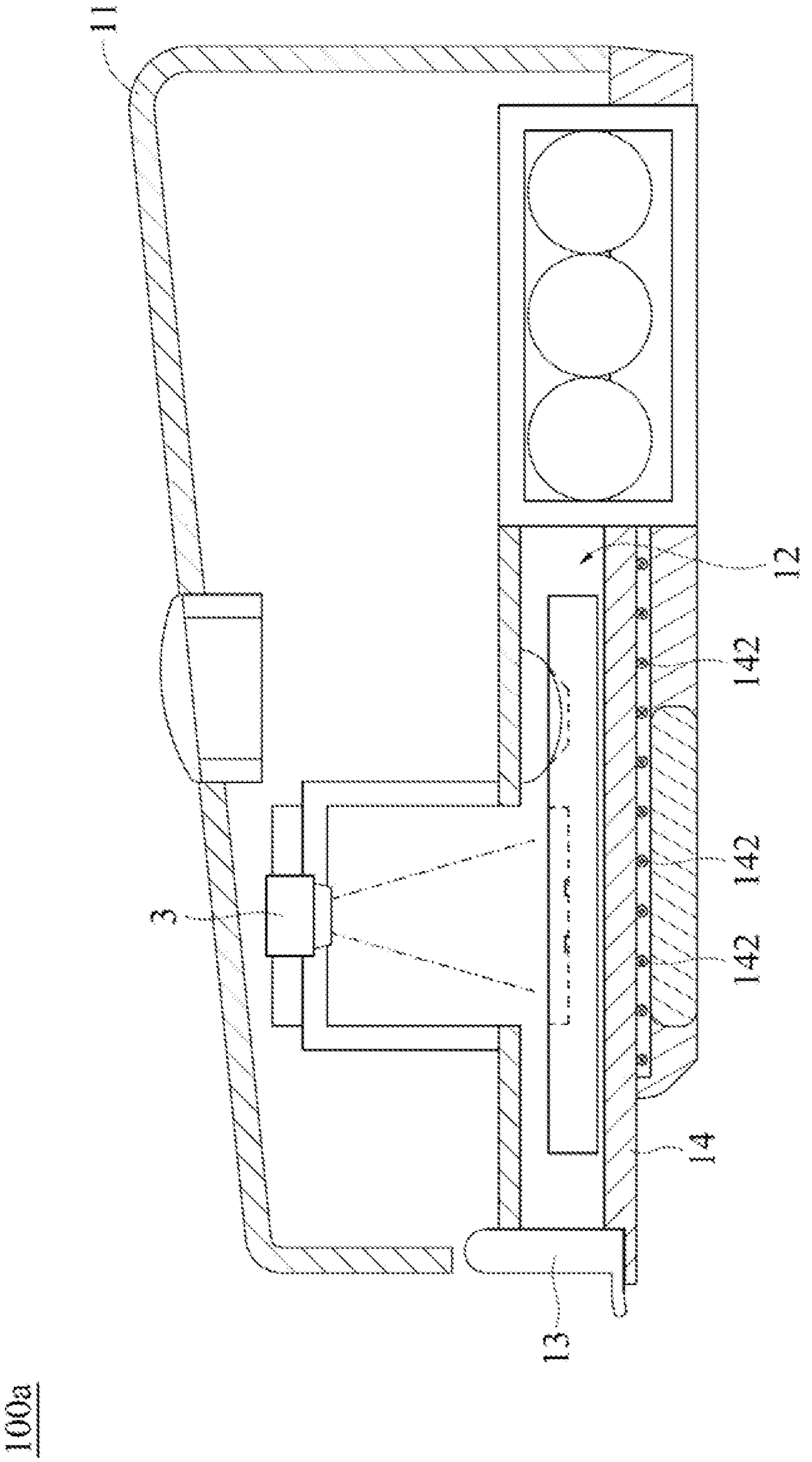
FIG. 9 is a schematic structural diagram of a bearing platform of an optical detection device according to an embodiment of the present disclosure.

FIG. 8 and FIG. 9 respectively are schematic structural diagrams of a bearing platform 14 of an optical detection device 100*a* according to an embodiment of the present disclosure. According to the embodiments shown in FIG. 8 and FIG. 9, a bottom of the bearing platform 14 includes a sliding portion 142, and the sliding portion 142 may be a sliding groove, a sliding rail or a roller, causing the bearing platform 14 to move relative to the opening 111 (the base 11), that is, the bearing platform 14 may move toward the operator, which is convenient for the operator to place the test cartridge 200 on the bearing platform 14, and then move away from the operator to return to an original position, as shown in FIG. 9. The bearing platform 14 may be moved manually, for example, the bearing platform 14 may be returned to the base 11 by means of pulling and pushing back. The bearing platform 14 may also be set to move automatically, which is not limited in the present disclosure.

Figure 10:
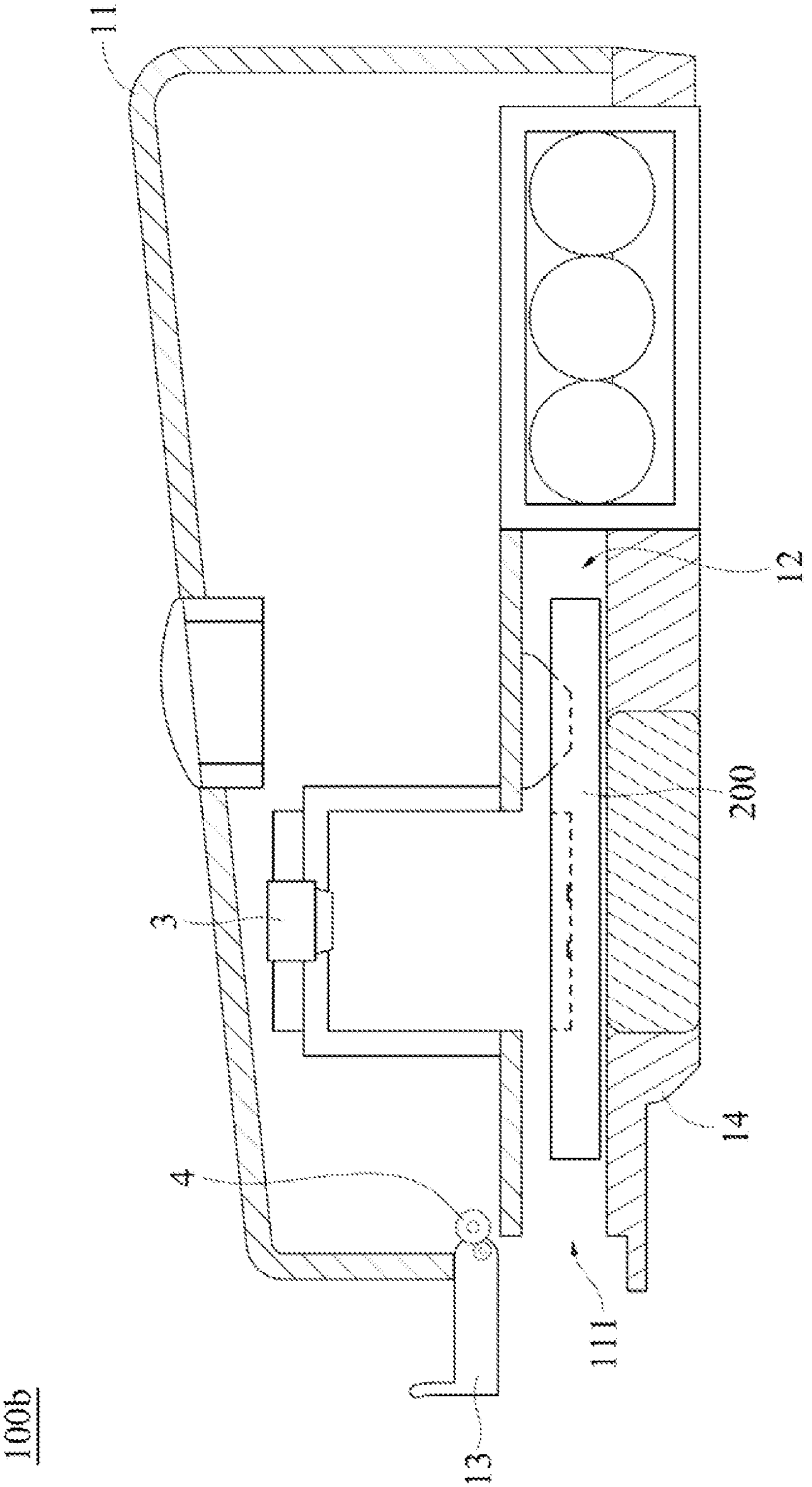
FIG. 10 is a schematic diagram of usage of an optical detection device according to an embodiment of the present disclosure.
Figure 11:
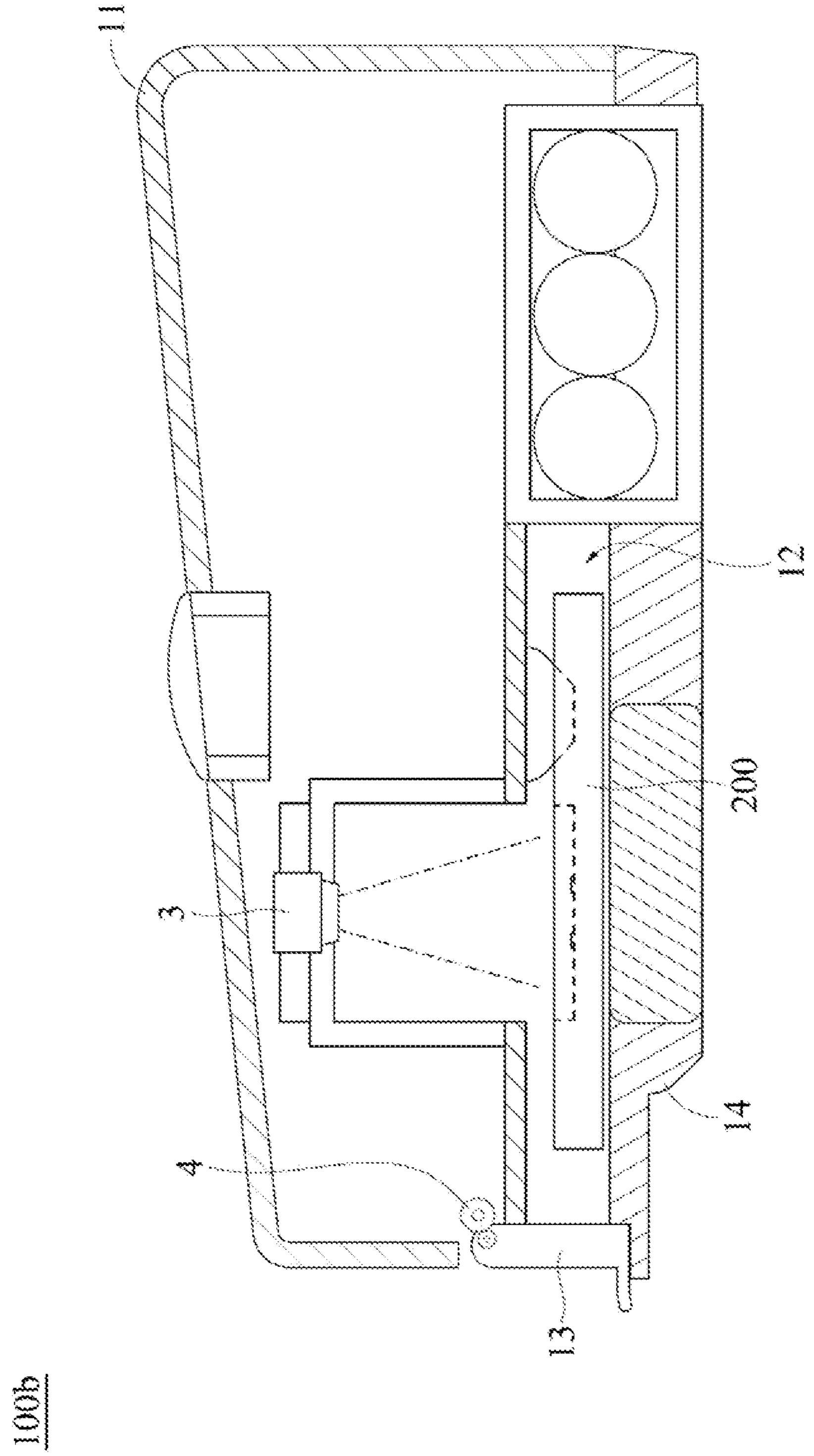
FIG. 11 is a schematic diagram of usage of an optical detection device according to an embodiment of the present disclosure.
Figure 12:
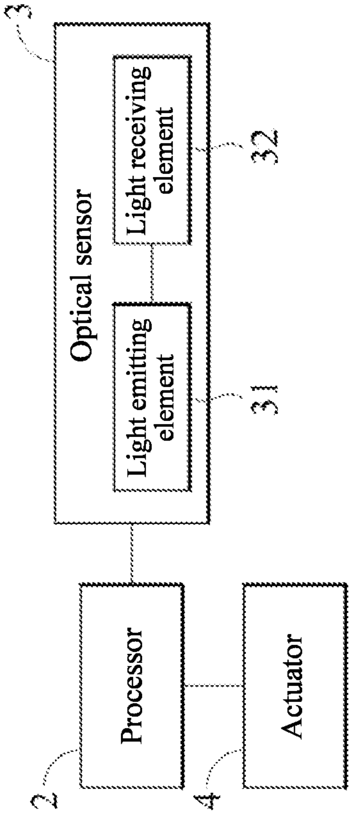
FIG. 12 is a schematic diagram of a relationship between a processor and an actuator according to an embodiment of the present disclosure.

Referring to FIG. 10 to FIG. 12, FIG. 10 and FIG. 11 respectively are schematic diagrams of usage of an optical detection device 100*b* according to an embodiment of the present disclosure. FIG. 12 is a schematic diagram of a relationship between a processor 2 and an actuator 4 according to an embodiment of the present disclosure. According to the embodiments shown in FIG. 10 and FIG. 11, the optical detection device 100 further includes an actuator 4 connected to the shield cover 13, and the processor 2 is further configured to control the actuator 4 to be actuated, to drive the shield cover 13 to open or close the opening 111, so as to automatically open or close the opening 111. According to some embodiments, the actuator 4 is a stepper motor.

Figure 13:
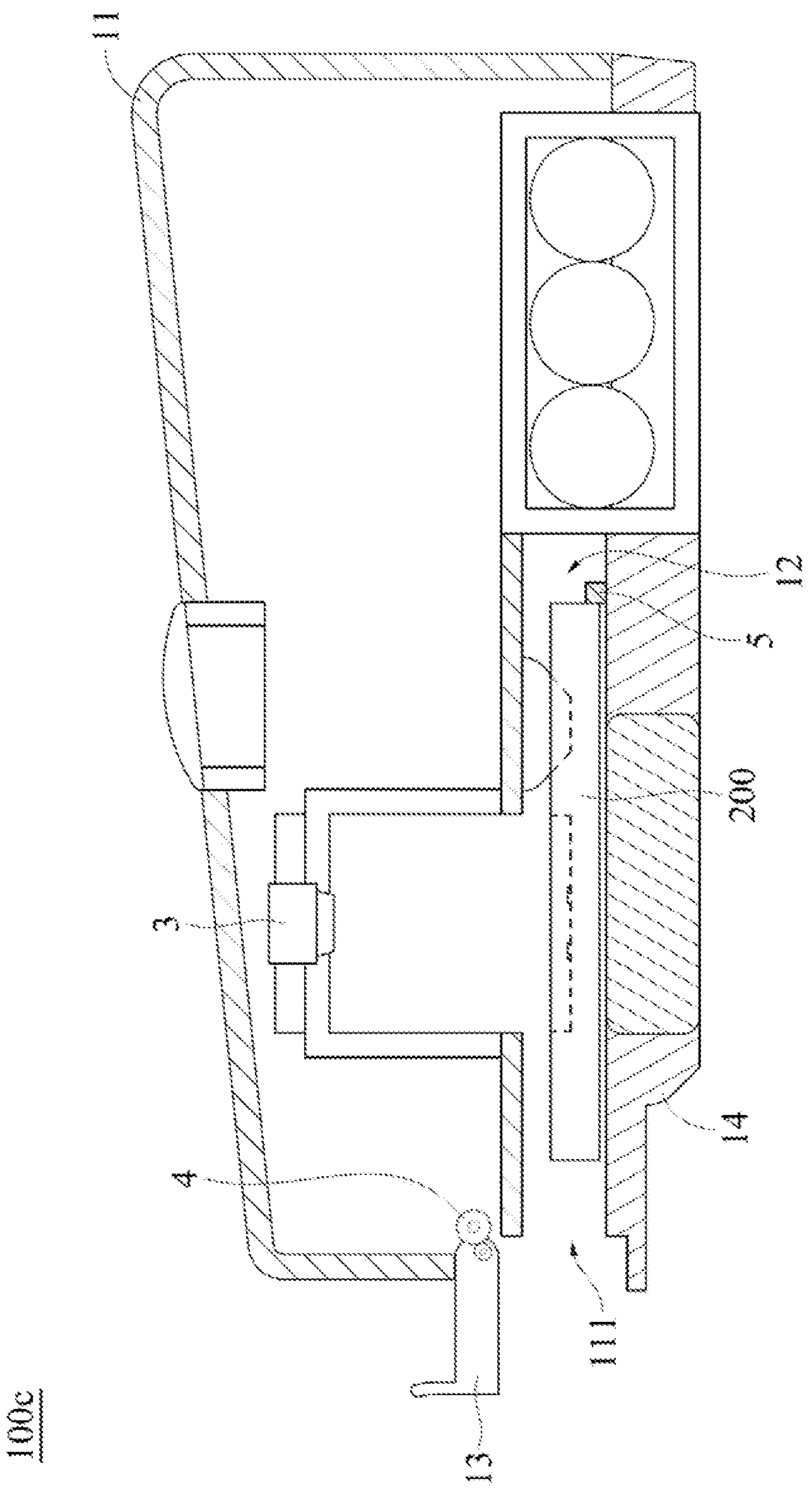
FIG. 13 is a schematic diagram of usage of an optical detection device according to an embodiment of the present disclosure.
Figure 14:
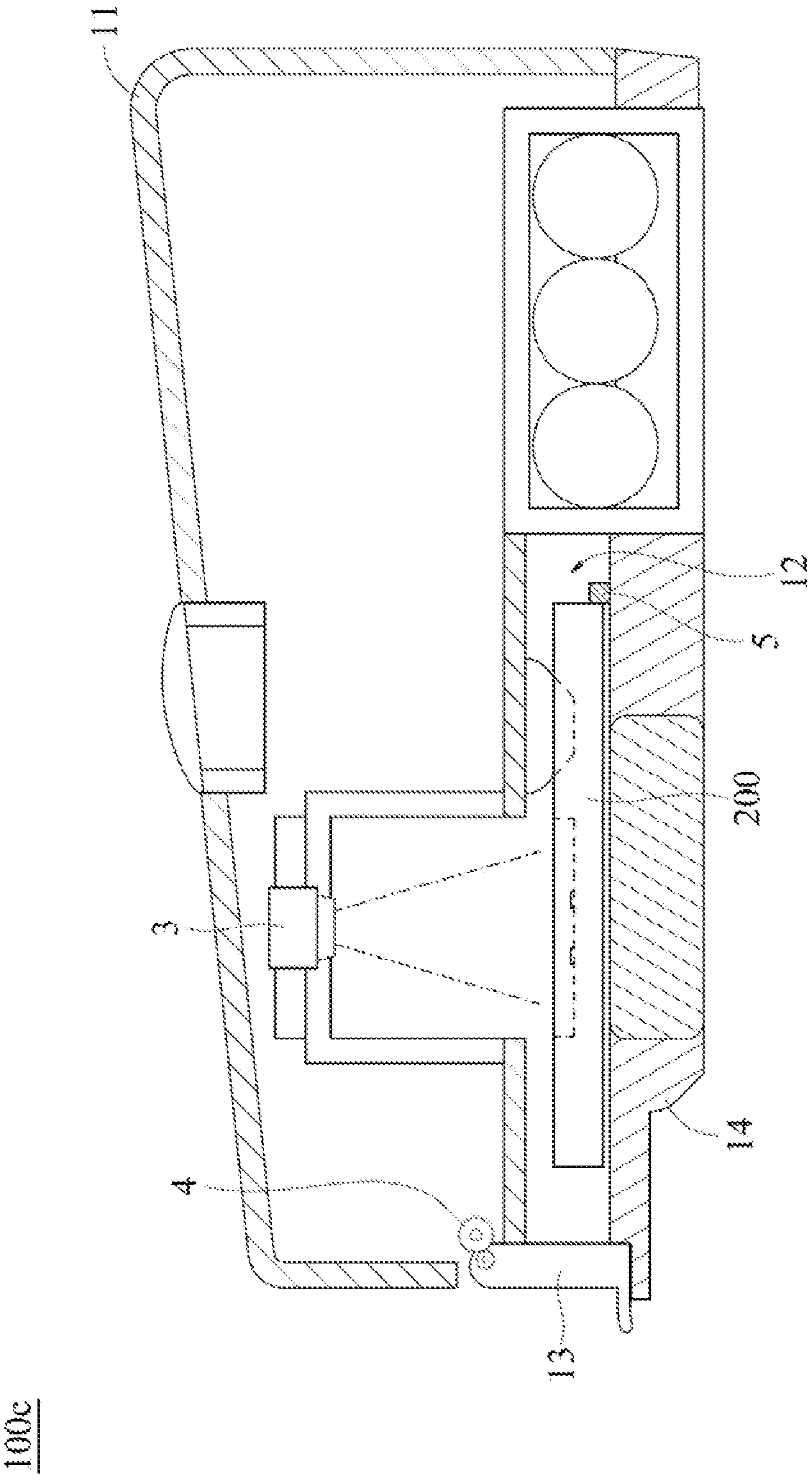
FIG. 14 is a schematic diagram of usage of an optical detection device according to an embodiment of the present disclosure.
Figure 15:
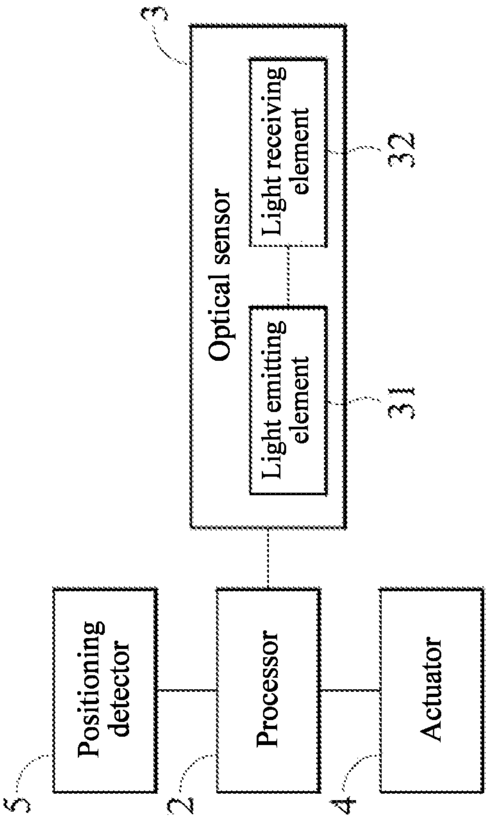
FIG. 15 is a schematic diagram of a relationship between a processor and a positioning detector according to an embodiment of the present disclosure.

Referring to FIG. 13 to FIG. 15, FIG. 13 and FIG. 14 respectively are schematic diagrams of usage of an optical detection device 100*c* according to an embodiment of the present disclosure. FIG. 15 is a schematic diagram of a relationship between a processor 2 and a positioning detector 5 according to an embodiment of the present disclosure. According to these embodiments, the optical detection device 100 further includes a positioning detector 5, where the positioning detector 5 sends a positioning signal when being actuated, the processor 2 transmits a closing signal to the actuator 4 in response to the positioning signal, and the actuator 4 drives the shield cover 13 to close the opening 111 according to the closing signal. The positioning detector 5 detects whether the test cartridge 200 is located at a fixed position of the cartridge placing portion 12, and sends a positioning signal when detecting that the test cartridge 200 is located at the fixed position, and the processor 2 further controls the actuator 4 to drive the shield cover 13 to close the opening 111 in response to the positioning signal. The positioning detector 5, when being actuated, may continuously detect whether the test cartridge is positioned at the fixed position when being powered on. Alternatively, the positioning detector 5, when being driven, may detect whether the test cartridge is positioned at the fixed position, which is not limited in the present disclosure.

Figure 16:
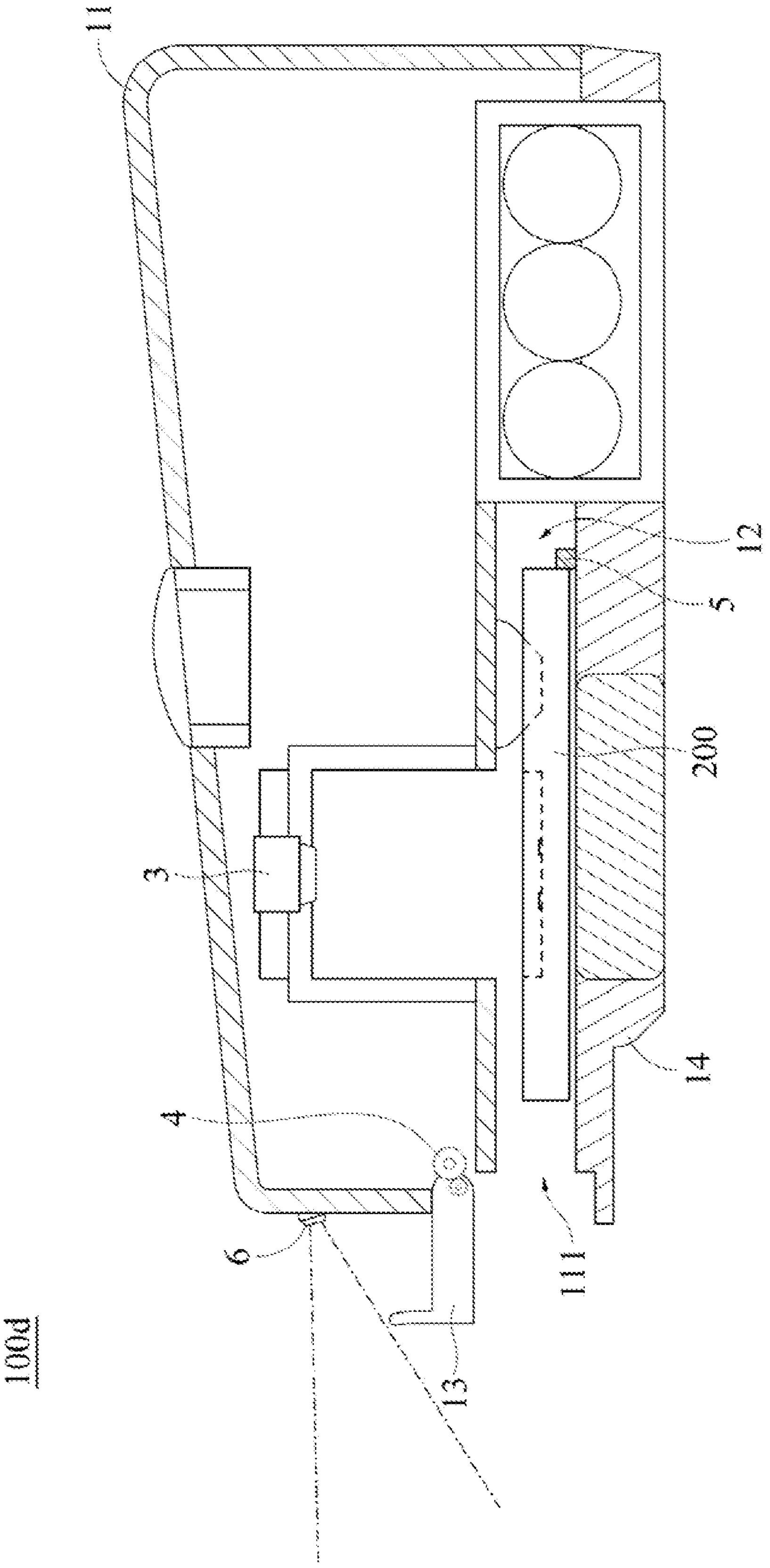
FIG. 16 is a schematic diagram of usage of an optical detection device according to an embodiment of the present disclosure.
Figure 17:
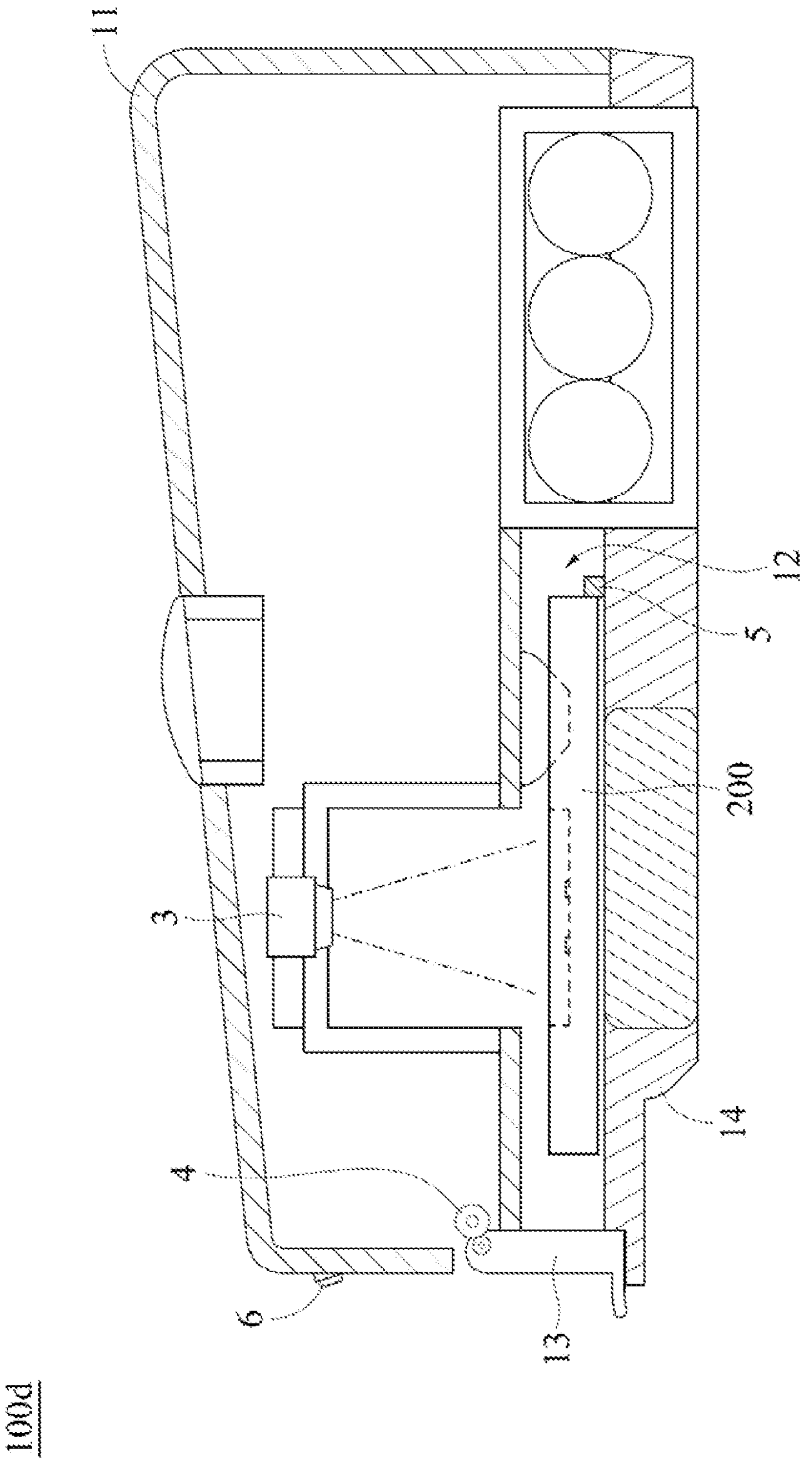
FIG. 17 is a schematic diagram of usage of an optical detection device according to an embodiment of the present disclosure.
Figure 18:
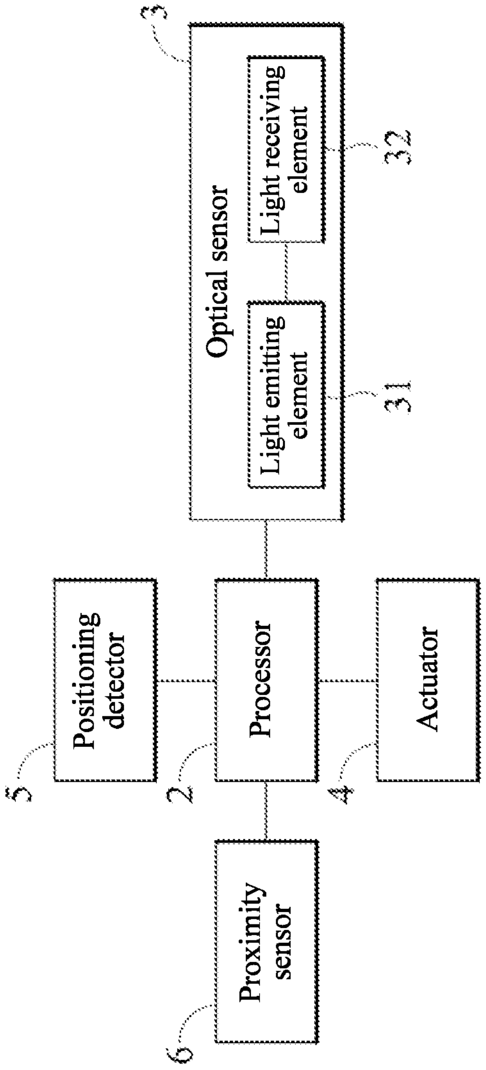
FIG. 18 is a schematic diagram of a relationship between a processor and a proximity sensor according to an embodiment of the present disclosure.

Referring to FIG. 16 to FIG. 18, FIG. 16 and FIG. 17 respectively are schematic diagrams of usage of an optical detection device 100*d* according to an embodiment of the present disclosure. FIG. 18 is a schematic diagram of a relationship between a processor 2 and a proximity sensor 6 according to an embodiment of the present disclosure. According to these embodiments, the optical detection device 100*d* further includes a proximity sensor 6. When the operator approaches the optical detection device 100*d*, the proximity sensor 6 detects the operator (the proximity sensor 6 is actuated), and sends a sensing signal, and the processor 2 transmits an opening signal to the actuator 4 in response to the sensing signal. According to the opening signal, the actuator 4 does not drive the shield cover 13 to close the opening 111, or the actuator 4 drives the shield cover 13 to open the opening 111. In other words, at this time, the opening 111 is in an open state, which is convenient for the operator to place the test cartridge 200 into the cartridge placing portion 12. However, in some embodiments, the shield cover 13 originally closes the opening 111. When the operator approaches the optical detection device 100*d*, the proximity sensor 6 is actuated to send a sensing signal, the processor 2 transmits an opening signal to the actuator 4 in response to the sensing signal, and the actuator 4 drives the shield cover 13 to open the opening 111 according to the opening signal.

Figure 19:
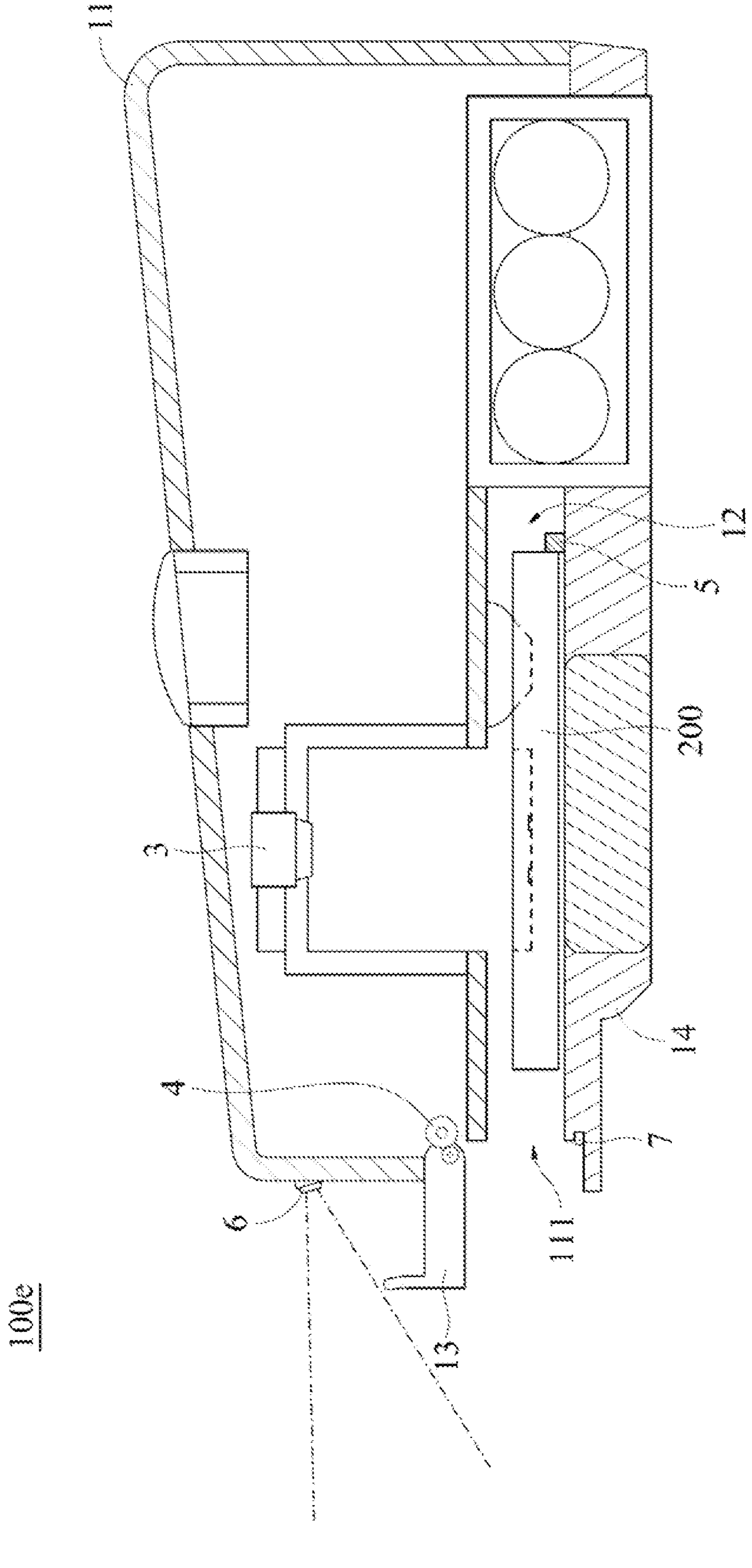
FIG. 19 is a schematic diagram of usage of an optical detection device according to an embodiment of the present disclosure.
Figure 20:
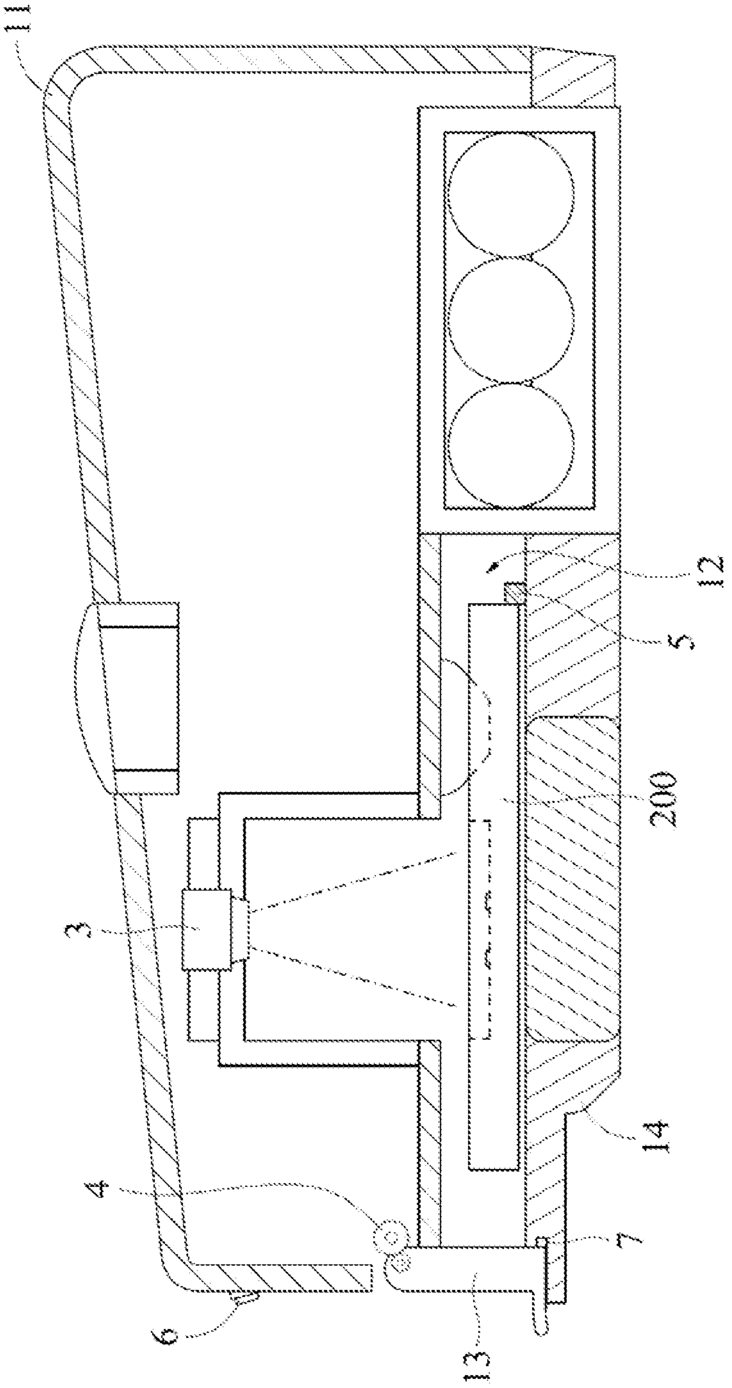
FIG. 20 is a schematic diagram of usage of an optical detection device according to an embodiment of the present disclosure.
Figure 21:
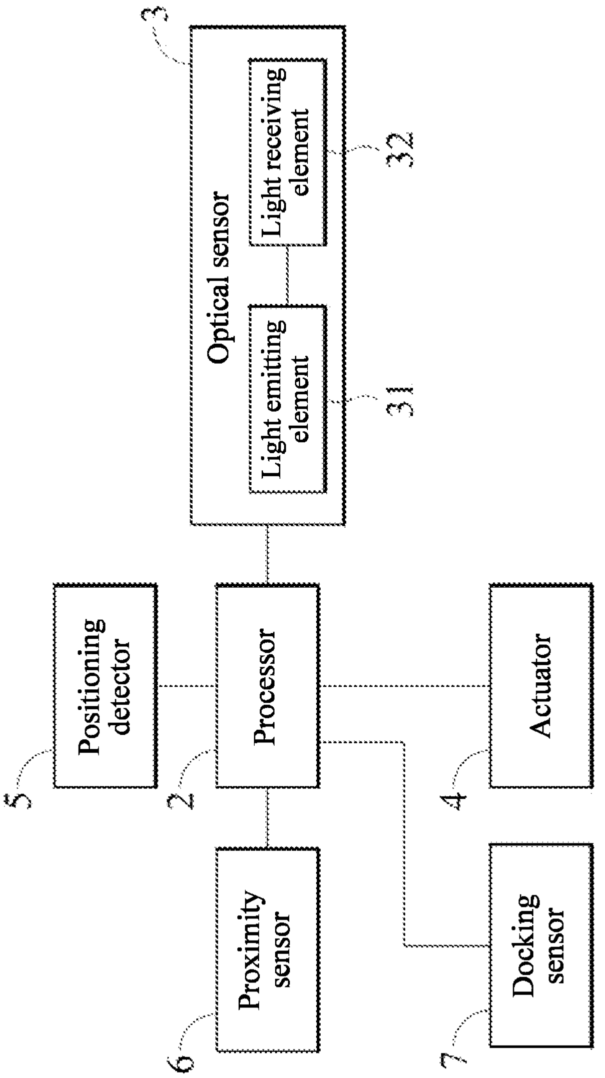
FIG. 21 is a schematic diagram of a relationship between a processor and a docking sensor according to an embodiment of the present disclosure.

Referring to FIG. 19 to FIG. 21, FIG. 19 and FIG. 20 respectively are schematic diagrams of usage of an optical detection device 100*e* according to an embodiment of the present disclosure. FIG. 21 is a schematic diagram of a relationship between a processor 2 and a docking sensor 7 according to an embodiment of the present disclosure. According to these embodiments, the optical detection device 100*e* further includes a docking sensor 7. The docking sensor 7 may be located on the first docking structure 141 or the second docking structure 132. According to the embodiment shown in FIG. 19, the docking sensor 7 is located on the first docking structure 141. When the first docking structure 141 and the second docking structure 132 are docked with each other, the docking sensor 7 sends a docking signal to the processor 2. According to some embodiments, the processor 2 outputs a tight closing signal in response to the docking signal, indicating that the shield cover 13 has closed the opening 111 at this time. The tight closing signal may be expressed by means of sound, light, or the like, to inform the operator that the shield cover 13 has closed the opening 111, and a next optical detection step may be performed. According to some embodiments, the docking sensor 7 is a pressure sensing detector. When the second docking structure 132 is docked with the first docking structure 141, the docking sensor 7 senses pressure from the second docking structure 132, and sends a docking signal. According to some other embodiments, the processor 2 further actively actuates the light emitting element 31 to emit light in response to the docking signal, and performs an optical sensing step.

Figure 22:
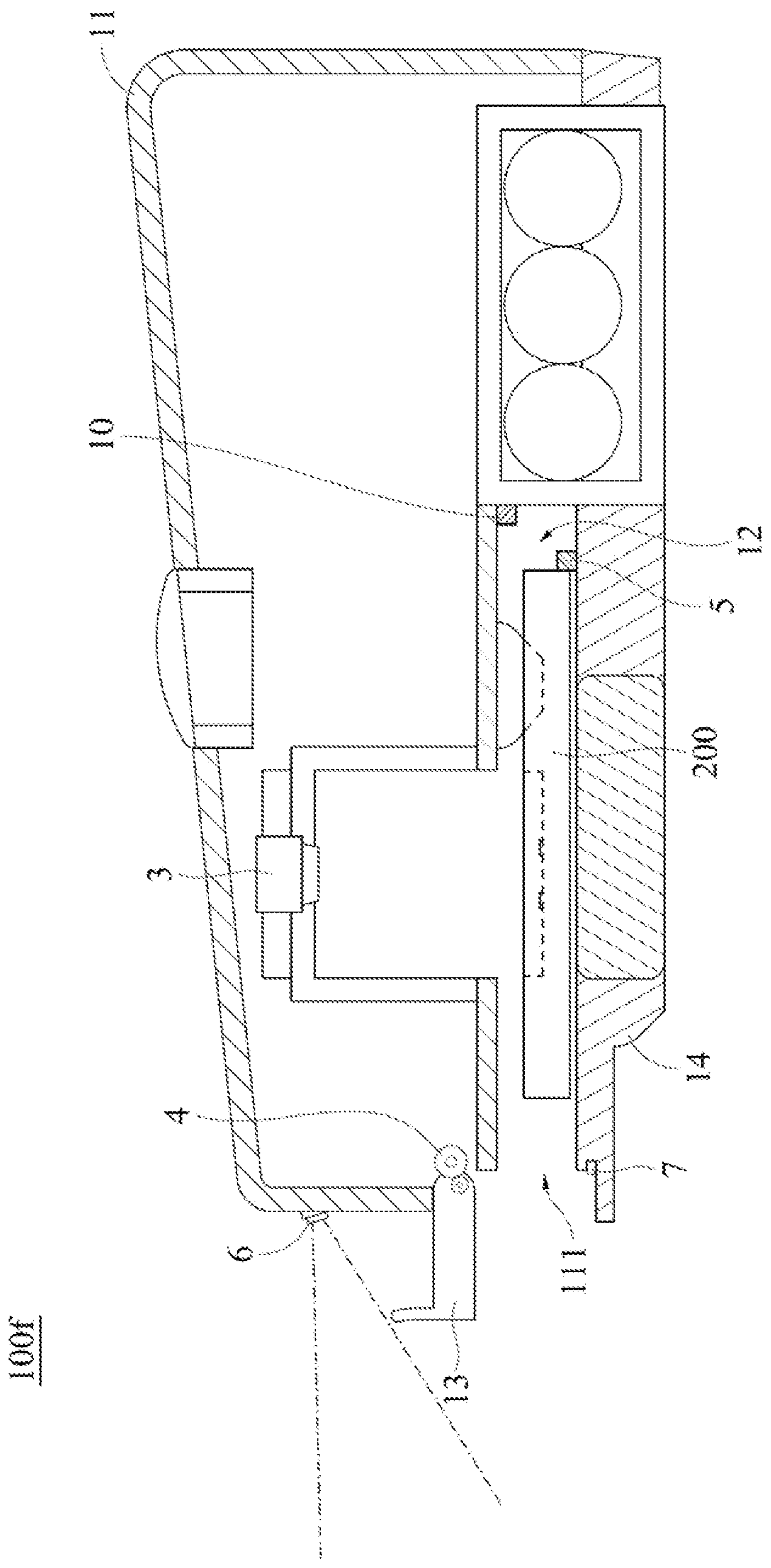
FIG. 22 is a schematic diagram of usage of an optical detection device according to an embodiment of the present disclosure.
Figure 23:
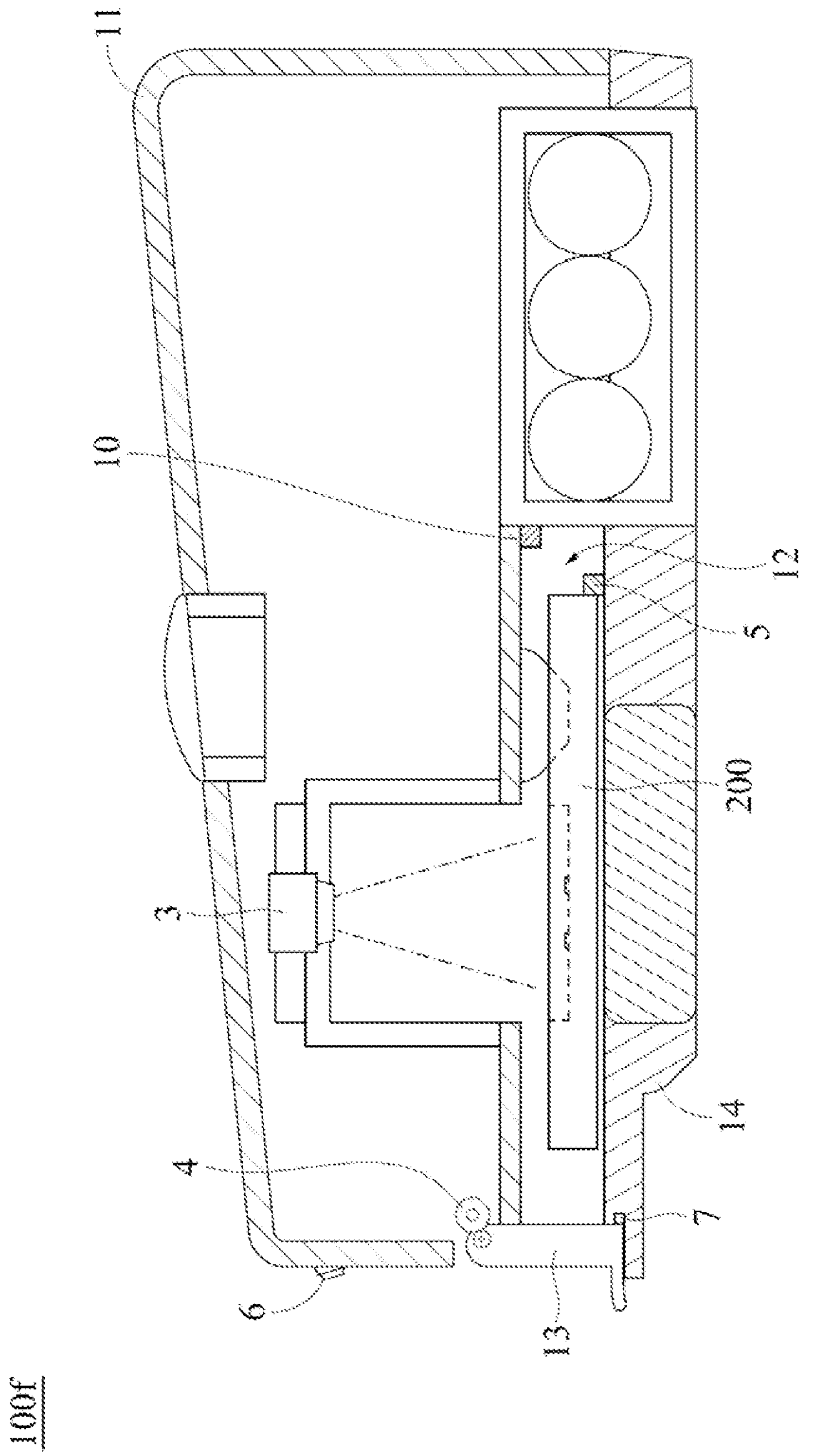
FIG. 23 is a schematic diagram of usage of an optical detection device according to an embodiment of the present disclosure.
Figure 24:
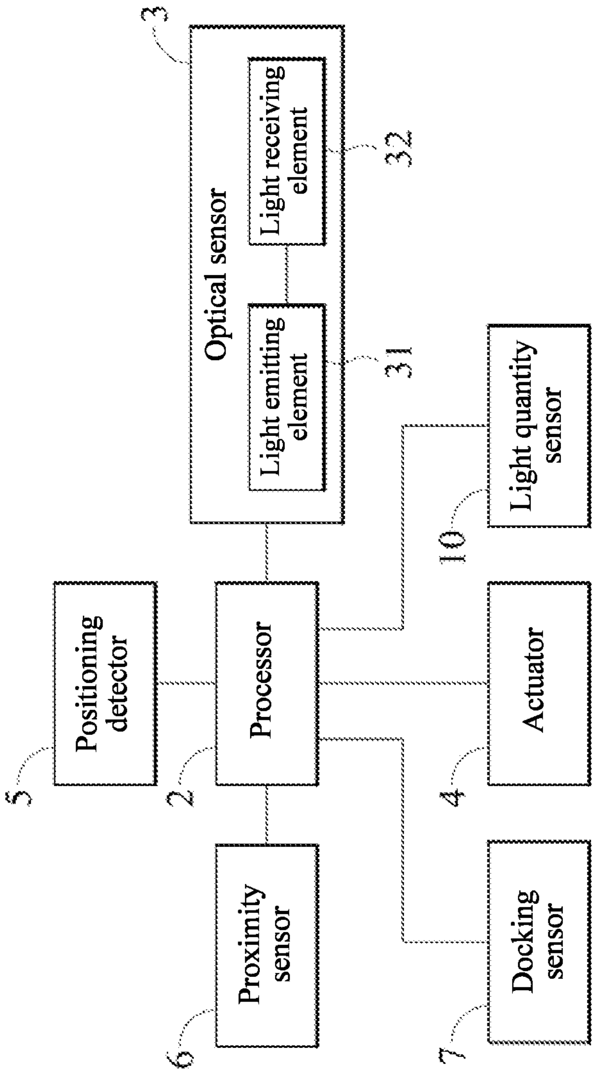
FIG. 24 is a schematic diagram of a relationship between a processor and a light quantity sensor according to an embodiment of the present disclosure.

Referring to FIG. 22 to FIG. 24, FIG. 22 and FIG. 23 respectively are schematic diagrams of usage of an optical detection device 100*f* according to an embodiment of the present disclosure. FIG. 24 is a schematic diagram of a relationship between a processor 2 and a light quantity sensor 10 according to an embodiment of the present disclosure. According to these embodiments, the optical detection device 100*f* further includes a light quantity sensor 10, configured to sense a light quantity in the cartridge placing portion 12, and to output a light quantity signal to the processor 2, and the processor 2 determines, according to the light quantity signal, whether to actuate the light emitting element 31 to emit light toward the cartridge placing portion 12. If external ambient light is incident on the opening 111, the light quantity in the cartridge placing portion 12 is not suitable for optical sensing. Therefore, the light quantity sensor 10 senses the light quantity in the cartridge placing portion 12, and outputs a light quantity signal to the processor 2. The processor 2 interprets whether the light quantity in the cartridge placing portion 12 is suitable for optical sensing at this time, and further determines whether to actuate the light emitting element 31 to emit light.

Figure 25:
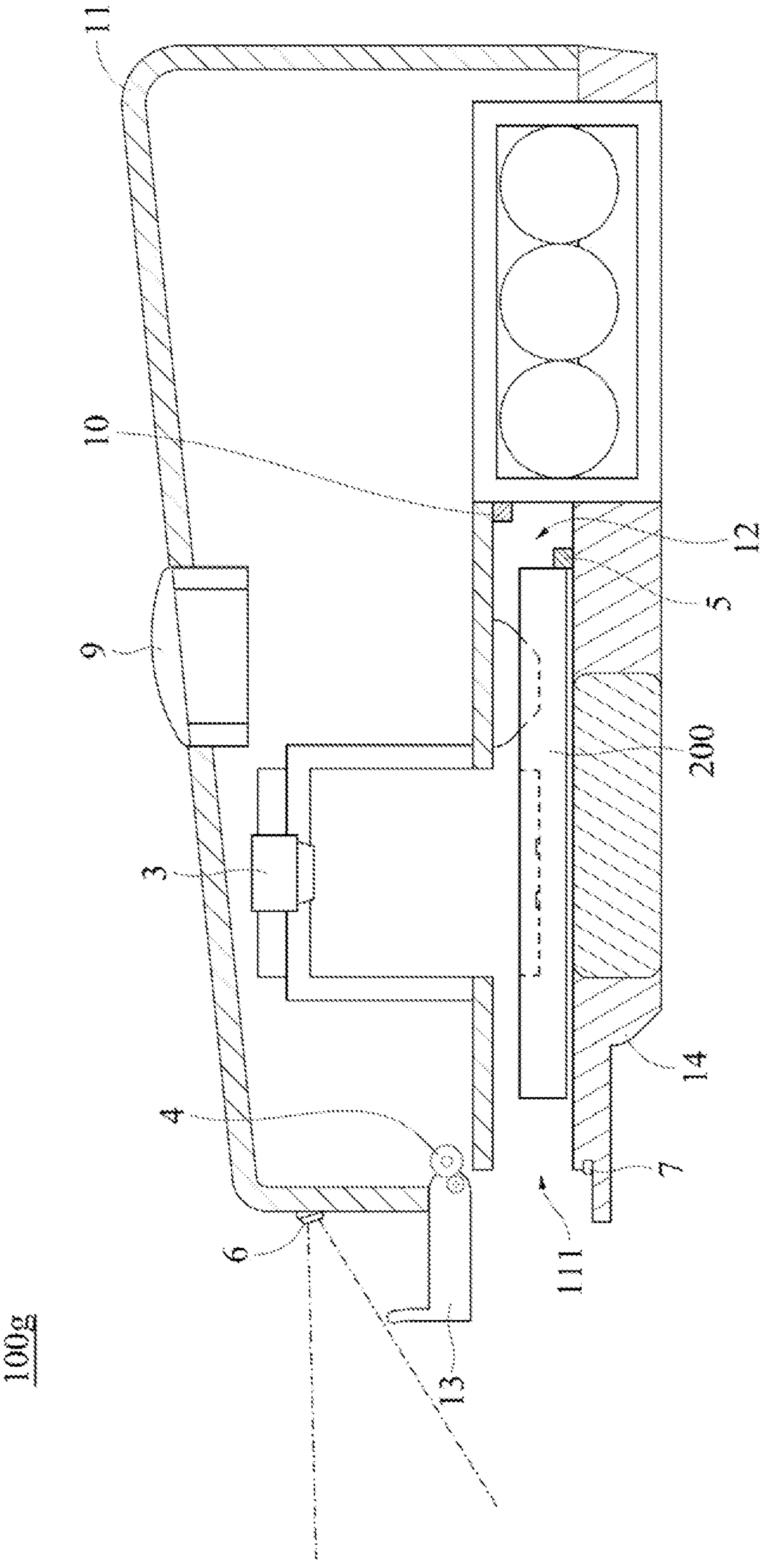
FIG. 25 is a schematic diagram of usage of an optical detection device according to an embodiment of the present disclosure.
Figure 26:
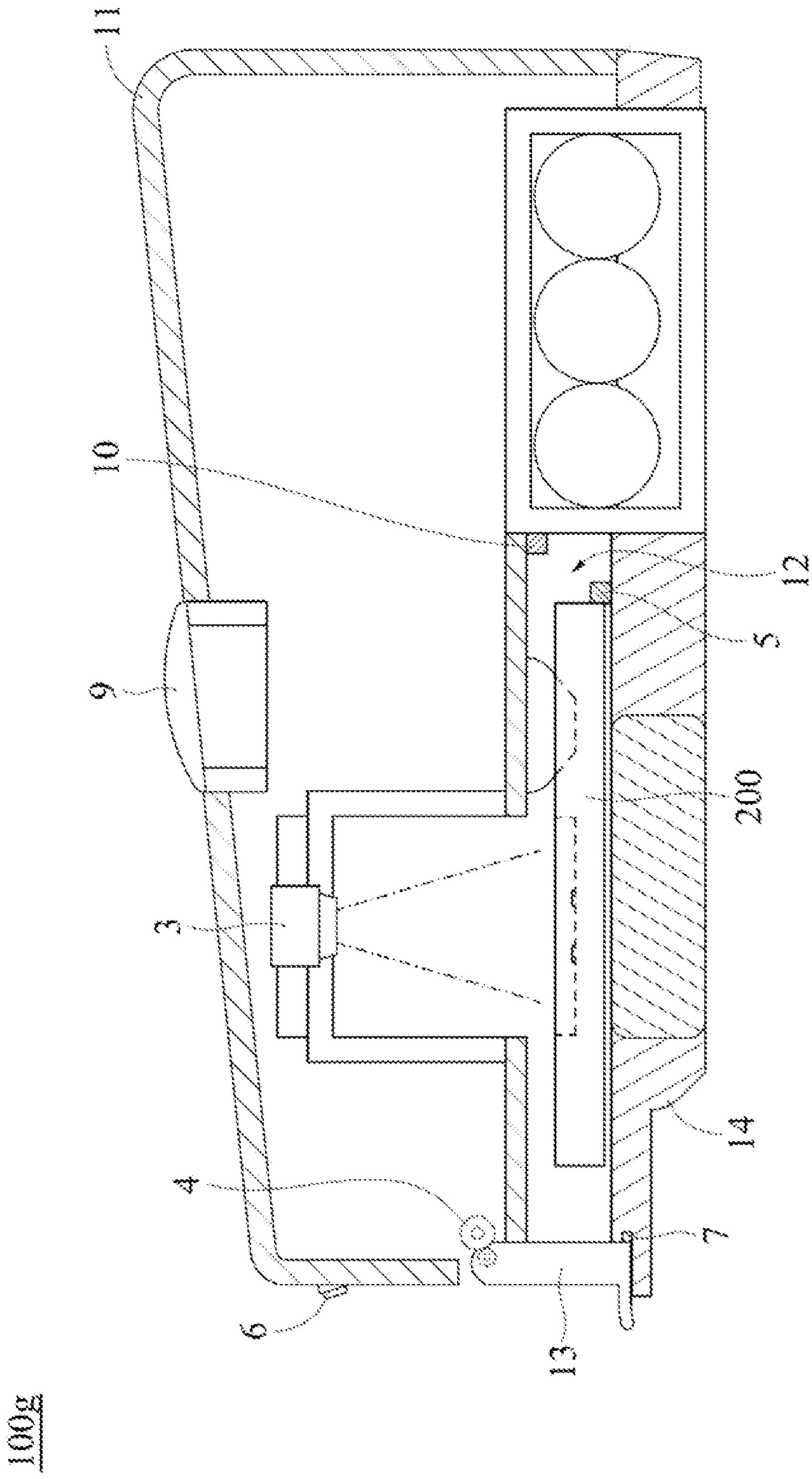
FIG. 26 is a schematic diagram of usage of an optical detection device according to an embodiment of the present disclosure.
Figure 27:
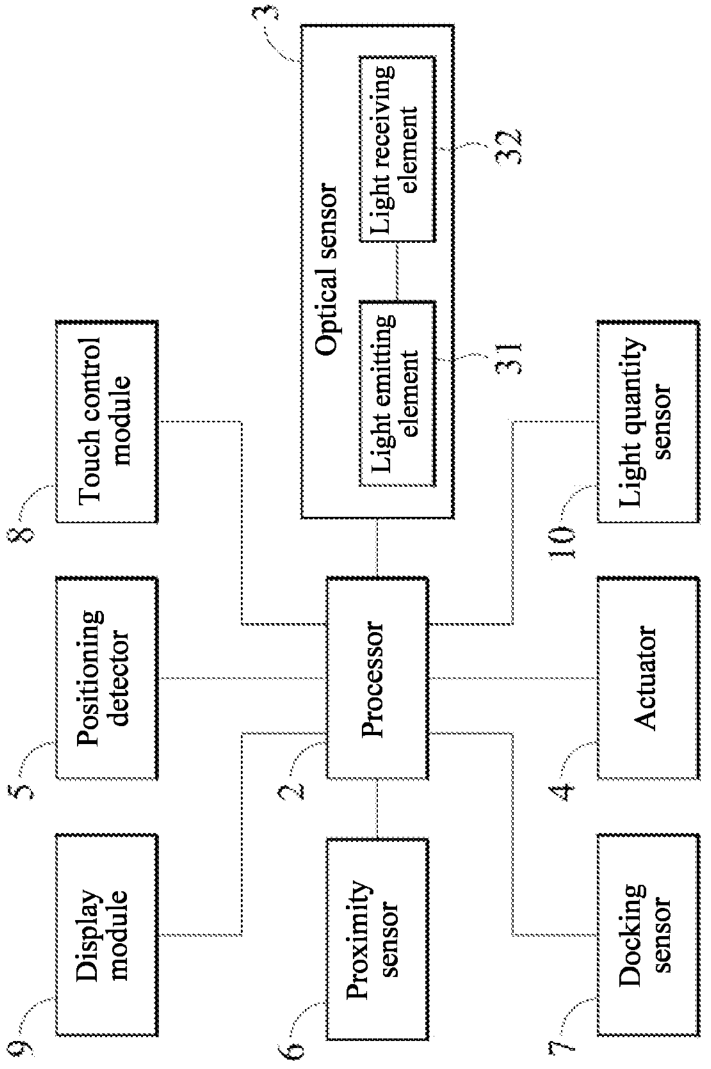
FIG. 27 is a schematic diagram of a relationship between a processor and a display module according to an embodiment of the present disclosure.

Referring to FIG. 25 to FIG. 27, FIG. 25 and FIG. 26 respectively are schematic diagrams of usage of an optical detection device 100*g* according to an embodiment of the present disclosure. FIG. 27 is a schematic diagram of a relationship between a processor 2 and a display module 9 according to an embodiment of the present disclosure. The optical detection device 100*g* further includes the display module 9. The display module 9 may display detection information for the operator to watch. According to the embodiment shown in FIG. 25, when the operator approaches the optical detection device 100, the proximity sensor 6 is actuated, the shield cover 13 does not close the opening 111 (or turns from closing the opening 111 to opening the opening 111), and the opening 111 is in an open state. The operator places the test cartridge 200 into the cartridge placing portion 12. When the test cartridge 200 is located at a fixed position of the cartridge placing portion 12, the positioning detector 5 is actuated, and the actuator 4 drives the shield cover 13 to close the opening 111. When the first docking structure 141 and the second docking structure 132 of the shield cover 13 are docked with each other, the docking sensor 7 is actuated to send a docking signal. The processor 2 actuates the light emitting element 31 to emit light in response to the docking signal, and performs an optical sensing step. The light receiving element 32 receives the light and converts the received light into an image signal. The processor 2 outputs detection information according to the image signal. Then the display module 9 displays the detection information, to complete the optical detection reading.

According to the embodiment shown in FIG. 27, the optical detection device 100*g* further includes a touch control module 8 connected to the processor 2, and the touch control module 8 receives an operation command from the operator to output a driving signal. The touch control module 8 may be a keyboard group or a touch control screen. According to some embodiments, the display module 9 and the touch control module 8 are integrated with each other, to provide operation and viewing functions for the operator.

According to some embodiments, the shield cover of the optical detection device effectively closes the opening, to block external light from entering the opening, thereby preventing the cartridge placing portion from being interfered by the external light during optical sensing, and reducing a risk that the processor misinterprets the image signal. According to some embodiments, when medical staff operate the optical detection device, because the shield cover completely closes the opening, virus of the specimen in the test cartridge can be prevented from escaping, thereby protecting safety of the operator. According to some embodiments, a docking sensor is arranged in the optical detection device. If the shield cover does not completely close the opening, the light emitting element is not actuated, so as to avoid performing optical sensing under a risk that an external light source enters the opening, affecting the processor interpreting the image signal, and causing misinterpretation.

What is claimed is:

1. An optical detection device, comprising:

a base, comprising an opening;

a cartridge placing portion, located in the base, and in communication with the opening;

a bearing platform, wherein the cartridge placing portion is located on the bearing platform, and the bearing platform comprises a first docking structure;

a shield cover, configured to open or close the opening, wherein the shield cover comprises a body and a second docking structure, the second docking structure is connected to the body, and the second docking structure is configured to be docked with the first docking structure;

a processor;

an optical sensor, connected to the processor, wherein the optical sensor comprises a light receiving element and a light emitting element, wherein the light receiving element is configured to convert a received light into an image signal;

a docking sensor, connected to the processor, located on the first docking structure or the second docking structure, wherein the docking sensor is configured to send a docking signal when the first docking structure is docked with the second docking structure;

an actuator, connected to the shield cover, wherein the processor is further configured to control the actuator to be actuated, to drive the shield cover to open or close the opening;

a proximity sensor, connected to the processor, wherein the proximity sensor sends a sensing signal when being actuated, and the processor transmits an opening signal to the actuator in response to the sensing signal;

a positioning detector, connected to the processor, wherein the positioning detector sends a positioning signal when being actuated, the processor transmits a closing signal to the actuator in response to the positioning signal, and the actuator drives the shield cover to close the opening according to the closing signal; and a display module, connected to the processor, wherein the processor outputs detection information according to the image signal, and the display module displays the detection information;

wherein the docking sensor is a pressure sensing detector, configured to detect a docking pressure between the first docking structure and the second docking structure, and to generate the docking signal only when the docking pressure exceeds a predetermined pressure threshold;

wherein the processor is configured to receive the docking signal from the docking sensor, and in response to the docking signal, receive a light quantity signal from the light receiving element sensing a light quantity in the cartridge placing portion before the light emitting element is actuated;

wherein the processor is further configured to compare a light quantity value of the light quantity signal with a preset light quantity value, and to condition actuation of the light emitting element to emit light toward the cartridge placing portion on the light quantity value being lower than the preset light quantity value;

wherein the first docking structure is a groove; the second docking structure comprises a toggle portion protruding from the body; and a size of the shield cover is larger than that of the opening, and an end of the shield cover is pivotally connected to the base by a torsion spring, and the torsion spring biases the shield cover toward a closed position such that the docking pressure is generated as the shield cover pivots into engagement with the first docking structure.

2. The optical detection device according to claim 1, wherein a bottom of the bearing platform comprises a sliding portion, causing the bearing platform to move relative to the opening.

3. The optical detection device according to claim 1, wherein the base comprises two protruding ribs, respectively located on two sides of the shield cover.

4. The optical detection device according to claim 1, wherein the base comprises two protruding ribs, the shield cover comprises two sliding grooves, and the two protruding ribs are respectively detachably located in the two sliding grooves.

5. The optical detection device according to claim 1, further comprising a touch control module connected to the processor; wherein the touch control module receives an operation command to output a driving signal, and the processor actuates the light emitting element in response to the driving signal, to emit light toward the cartridge placing portion.

* * * * *